US012293265B1

(12) United States Patent
Smith et al.

(10) Patent No.: US 12,293,265 B1
(45) Date of Patent: May 6, 2025

(54) APPARATUS AND METHOD FOR MODEL OPTIMIZATION

(71) Applicant: The Strategic Coach Inc., Toronto (CA)

(72) Inventors: Barbara Sue Smith, Toronto (CA); Daniel J. Sullivan, Toronto (CA)

(73) Assignee: The Strategic Coach Inc., Toronto (CA)

( * ) Notice: Subject to any disclaimer, the term of this patent is extended or adjusted under 35 U.S.C. 154(b) by 0 days.

(21) Appl. No.: 18/409,666

(22) Filed: Jan. 10, 2024

(51) Int. Cl.
*G06N 20/00* (2019.01)

(52) U.S. Cl.
CPC ................... *G06N 20/00* (2019.01)

(58) Field of Classification Search
CPC .................................. G06N 20/00
See application file for complete search history.

(56) References Cited

U.S. PATENT DOCUMENTS

| 11,625,626 | B2 | 4/2023 | Zaslavsky | |
|---|---|---|---|---|
| 2020/0065702 | A1* | 2/2020 | Nag | G06N 5/043 |
| 2020/0125586 | A1* | 4/2020 | Rezaeian | G06F 3/048 |
| 2020/0126167 | A1 | 4/2020 | Meerkov | |
| 2021/0304074 | A1 | 9/2021 | Zaremoodi | |
| 2021/0319887 | A1* | 10/2021 | Derrick, Jr. | A61B 5/7275 |
| 2021/0398666 | A1* | 12/2021 | Maslik | G16H 15/00 |
| 2024/0203438 | A1* | 6/2024 | Karadagur Ananda Reddy | G10L 21/0208 |

OTHER PUBLICATIONS

Womelsdorf T, Watson MR, Tiesinga P. Learning at variable attentional load requires cooperation of working memory, meta-learning, and attention-augmented reinforcement learning. Journal of Cognitive Neuroscience. Dec. 1, 2021;34(1):79-107. (Year: 2021).*
Xu H, Liu X, Yu W, Griffith D, Golmie N. Reinforcement learning-based control and networking co-design for industrial internet of things. IEEE Journal on Selected Areas in Communications. Mar. 23, 2020;38(5):885-98. (Year: 2020).*
Apps, Matthew AJ, Elise Lesage, and Narender Ramnani. "Vicarious reinforcement learning signals when instructing others." Journal of Neuroscience 35.7 (2015): 2904-2913. (Year: 2016).*

* cited by examiner

Primary Examiner — Oluwatosin Alabi
(74) *Attorney, Agent, or Firm* — Caldwell Intellectual Property Law

(57) ABSTRACT

An apparatus and method for model optimization. is disclosed. The apparatus comprises at least a processor and a memory communicatively connected to the at least a processor. The memory instructs the processor to generate a positive feedback function of an optimal measurement, wherein generating the positive feedback function further comprises identifying, using an optimal machine-learning model, a first set of parameter changes to a subsystem corresponding to the optimal measurement, and generate a negative feedback function of the suboptimal measurement, wherein generating the negative feedback function comprises identifying, using a suboptimal machine-learning model, a second set of parameter changes to a subsystem corresponding to the suboptimal measurement.

14 Claims, 8 Drawing Sheets

US 12,293,265 B1

APPARATUS AND METHOD FOR MODEL OPTIMIZATION

FIELD OF THE INVENTION

The present invention generally relates to the field of artificial intelligence. In particular, the present invention is directed to an apparatus and method for model optimization.

BACKGROUND

Recent increases in computational efficiency have enabled iterative analysis of data describing complex phenomena. However, such analysis of data may fail for lack of systems to correctly identify a degree of inaccuracy in the iterative analysis process. Prior programmatic attempts to resolve these and other related issues have suffered from inadequate feedback of data analysis.

SUMMARY OF THE DISCLOSURE

In an aspect, a method for identifying model optimization is provided. The method includes measuring, by a computing device, a plurality of subsystems, wherein the plurality of subsystems includes at least one remote device, and wherein measuring produces a plurality of measurements, comparing, by a computing device, each measurement of the plurality of measurements to a predetermined range, wherein the predetermined range comprises a lower threshold and an upper threshold, identifying, by a computing device, an optimal measurement of the plurality of measurements and a suboptimal measurement of the plurality of measurements as a function of each of the comparisons, generating, by a computing device, a positive feedback function of the optimal measurement, wherein generating the positive feedback function further comprises identifying, using an optimal machine-learning model, a first set of parameter changes to a subsystem corresponding to the optimal measurement, generating, by a computing device, a negative feedback function of the suboptimal measurement, wherein generating the negative feedback function comprises identifying, using a suboptimal machine-learning model, a second set of parameter changes to a subsystem corresponding to the suboptimal measurement, and configuring the at least one remote device using the positive feedback function and the negative feedback function.

In another aspect, an apparatus for model optimization is provided. The apparatus includes at least a processor and a memory communicatively connected to the at least a processor. The memory contains instructions configuring the at least a processor to measure a plurality of subsystems, wherein the plurality of subsystems includes at least one remote device, and wherein measuring produces a plurality of measurements, compare each measurement of the plurality of measurements to a predetermined range, wherein the predetermined range comprises a lower threshold and an upper threshold, identify an optimal measurement of the plurality of measurements and a suboptimal measurement of the plurality of measurements as a function of each of the comparisons, generate a positive feedback function of the optimal measurement, wherein generating the positive feedback function further comprises identifying, using an optimal machine-learning model, a first set of parameter changes to a subsystem corresponding to the optimal measurement, generate a negative feedback function of the suboptimal measurement, wherein generating the negative feedback function comprises identifying, using a suboptimal machine-learning model, a second set of parameter changes to a subsystem corresponding to the suboptimal measurement, and configure the at least one remote device using the positive feedback function and the negative feedback function.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to an apparatus, and a method for identifying a model optimization. Compilation and analysis of data can allow for efficient projections of structures that aid in the operations of entities.

Figure 1:
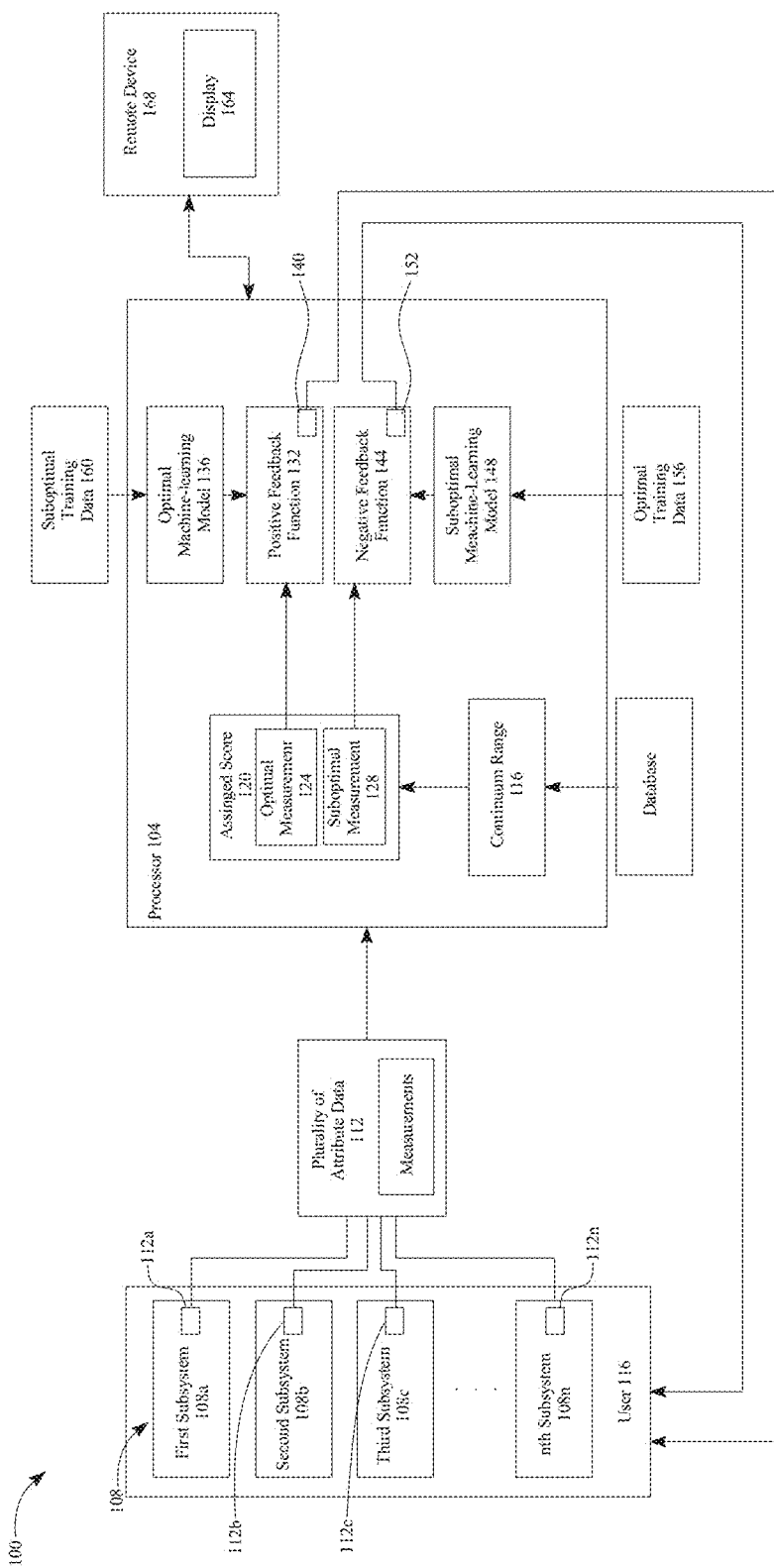
FIG. 1 is a block diagram of an exemplary embodiment of an apparatus identifying model optimization.

Referring now to FIG. 1, an exemplary embodiment of an apparatus 100 for model optimization is illustrated. Apparatus 100 may include a processor 104. Processor 104 may be communicatively connected to a memory, which is configured to provide executable instructions to processor 104, as discussed further in FIG. 8. Processor 104 may include any computing device as described in this disclosure, such as the computing device of FIG. 8. Processor 104 may include, without limitation, a computing device, a microcontroller, microprocessor, digital signal processor (DSP), and/or system on a chip (SoC) as described in this disclosure. Processor 104 may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented using a "shared nothing" architecture in which data is cached at the user, in an embodiment, this may enable scalability of apparatus 100 and/or processor 104.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing. For instance, and without limitation, optimal or suboptimal machine-learning models may perform any steps disclosed herein iteratively. For example, and without limitation, training data may be iteratively fed back into the optimal or suboptimal machine-learning models to update the optimal or suboptimal machine-learning models, respectively, such that continuously updated training data may be used to generate an updated machine-learning model (e.g., updated optimal machine-learning model or updated suboptimal machine-learning model), as discussed further in this disclosure.

With continued reference to FIG. 1, apparatus 100 includes a memory. Memory is communicatively connected to processor 104. Memory may contain instructions configuring processor 104 to perform tasks, processes, and/or steps described in this disclosure. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, apparatus, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example, and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, without limitation, via a bus or other facility for intercommunication between elements of a computing device. Communicative connecting may also include indirect connections via, for example, and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, apparatus 100, such as computing device and/or processor 104 of apparatus 100, may be configured to measure one or more subsystems 108*a-n* related to one or more users. For instance, and without limitation, computing device and/or processor 104 may be configured to measure a plurality of subsystems 108. In one or more embodiments, plurality of subsystems may include any number of subsystems. For example, and without limitation, plurality of subsystems may include a first subsystem 108*a*, a second subsystem 108*b*, a third subsystem 108*c*, and so on to an nth subsystem 108*n*. In one or more embodiments, measuring one or more subsystems 108*a-n*, such as plurality of subsystems 108, may produce a plurality of attribute data 112, such as one or more corresponding plurality of attribute data 112*a-n*. In exemplary non-limiting embodiments, and without limitation, first subsystem 108*a* may have corresponding first plurality of attribute data 112*a*, second subsystem 108*b* may have corresponding second plurality of attribute data 112*b*, third subsystem 108*c* may have corresponding third plurality of attribute data 112*b*, and nth subsystem 108*n* may have corresponding nth plurality of attribute data 112*n*.

With continued reference to FIG. 1, for the purposes of this disclosure, a "subsystem" is a component of a system, which includes a measured aspect related to one or more related users 116. In one or more embodiments, subsystem may include an entity. In one or more embodiments, subsystem may include a device of the entity and/or users, such as a remote device (e.g., remote device 168). A remote device may include a device that is separate from computing device. For example, and without limitation, remote device 168 may include a smartphone, laptop, desktop, tablet, one or more various electronic devices, and the like. A user may include an individual, an entity, an organization, and the like. For instance, and without limitation, an individual may include a client of an entity, an employee of an entity, an employer, a contractor of an entity, an agent of an entity, and the like. In another instance, and without limitation, an entity may include an employer or a business, such as, for example, a company or a commercial business. In another instance, and without limitation, an organization may include a profit or non-profit organization, where an organization may include an organized body, such as a society, association, or the like. In various embodiments, a subsystem may include areas of practice an entity or characteristic categories of an individual. For instance, and without limitation, first subsystem 108a maybe related to a first characteristic of a user, second subsystem 108b maybe related to a second characteristic of a user, third subsystem 108c maybe related to a third characteristic of a user, and so on to nth subsystem 108n, which may be related to an nth characteristic of a user. For example, in a non-limiting exemplary embodiment, and without limitation, first subsystem 108a of an entity may include information related to the sales branch of an entity and second subsystem 108b of an entity may include information related to the legal branch of the entity. In another example, and without limitation, first subsystem 108a may include information related to an emotional state of an employee and second subsystem 108b may include information related to productivity of an employee. In another example, and without limitation, first subsystem 108a may include information related to an emotional state of an employee of an entity and second subsystem 108b may include information related to productivity of the entity.

In continued reference to FIG. 1, the plurality of attribute data 112 associated with plurality of subsystems 108 may include various types of data. For the purposes of this disclosure, attribute data is information related to characteristics or elements of a subsystem and/or user. For instance, and without limitation, plurality of attribute data 112 may include performance data, which includes information related to one or more activities, categories of action, or the like that are performed by one or more users. For instance, and without limitation, an activity may include a task conducted by a user, such as an employee. In one or more nonlimiting exemplary embodiments, a task may include writing a report, maintaining client relations, performing accounting, executing a requested action by a client or employer, and the like. In other nonlimiting exemplary embodiments, plurality of data may include activities performed by a user that are based off of an attribute of the user. For example, and without limitation, an attribute of a user may include an attribute of an individual, such as, for example, skill, education, temperament, deportment trait, personality trait, current role (e.g., job position or role relative to an employer), anticipated role (e.g., role goal or expected promotion), current or future compensation (e.g., salary of induvial), revenue (e.g., revenue of entity), and the like. In one or more embodiments, the plurality of data may include one or more cognitive identifiers. A "cognitive identifier," for the purposes of this disclosure, is an indicator of mental traits of an individual. For example, and without limitation, a cognitive identifier may include instinctive operations of an individual (e.g., risk aversion, assertiveness, aptitude), an emotional state or temperament (e.g., a current mindset, such as happiness or aggression, or potential mindset), and the like. Cognitive identifiers may include a quantitative value, such as a score. Such information may be received using questionnaires filled out by the user or a third party (e.g., a supervisor of the individual, a client of the entity, and the like), user input, social media monitoring, productivity measurements, and the like.

With continued reference to FIG. 1, measuring of one or more subsystems may include receiving a plurality of data associated with the one or more subsystems 108a-n. For example, and without limitation, user or a third party may manually input plurality of attribute data 112 into processor 104 using a graphical user interface of processor 104 or a remote device, such as for example, a smartphone or laptop. The plurality of attribute data 112 may additionally be generated via an answer to a series of questions. The series of questions may be implemented using, for example, a chatbot or an interactive software. A chatbot may be configured to generate questions regarding any element or parameter of a subsystem. In some embodiments, chatbot may be configured to generate questions regarding missing elements of a subsystem. In a non-limiting embodiment, a user may be prompted to input specific information or may fill out a questionnaire. In one or more embodiments, graphical user interface may display a series of questions to prompt a user for information pertaining to one or more subsystems.

Still referring to FIG. 1, in other embodiments, measuring plurality of attribute data 112 may include retrieving plurality of data by processor 104, where plurality of attribute data 112 may be transmitted using a wired or wireless communication, as previously discussed in this disclosure. Measuring plurality of attribute data 112 may include retrieving plurality of attribute data 112 from multiple sources, such as one or more third-party sources or a user record. In one or more embodiments, transmitted plurality of attribute data 112 may be placed through an encryption process for security purposes.

With continued reference to FIG. 1, plurality of attribute data 112 may include user records, inventory records, financial records, human resource records, user profiles, sales records, revenue history, current revenue, manufacturing data, clientele records, user notes, and the like. Plurality of attribute data 112 may be based on various criteria such as a time, duration, geographic location, and the like. For instance, in one or more embodiments, a plurality of attribute data 112 may include user records. As used in the current disclosure, a "user record" is a document that contains information regarding a user. User records may include information related to an individual, such as user credentials, reports, employment performance, employee record, medical records, business records, goals, government records, and the like. For example, and without limitation, a user record may include an employee record. An employee record may include, for example, an employee evaluation, human resource record, client file, invoice, timecard, and the like. In some embodiments, user record may include a variety of types of notes entered over time by the user, entity, employees of the user, employer of the user, advisors, agents, and the like. User record may be converted into machine-encoded text using optical character recognition (OCR).

Still referring to FIG. 1, in some embodiments, optical character recognition includes automatic conversion of images of written (e.g., typed, handwritten, or printed text) into machine-encoded text. In some cases, recognition of at least a keyword from an image component may include one or more processes, including without limitation optical character recognition (OCR), optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine learning processes. In some cases, intelligent word recognition (IWR) may recognize written text, one word at a time, for instance by employing machine learning processes.

Still referring to FIG. 1, in some cases, OCR may be an "offline" process, which analyses a static document or image frame. In some cases, handwriting movement analysis can be used as input for handwriting recognition. For example, instead of merely using shapes of glyphs and words, this technique may capture motions, such as the order in which segments are drawn, the direction, and the pattern of putting the pen down and lifting it. This additional information can make handwriting recognition more accurate. In some cases, this technology may be referred to as "online" character recognition, dynamic character recognition, real-time character recognition, and intelligent character recognition.

Still referring to FIG. 1, in some cases, OCR processes may employ pre-processing of image components. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to the image component to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from the background of the image component. In some cases, binarization may be required for example if an employed OCR algorithm only works on binary images. In some cases. a line removal process may include the removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify a script allowing an appropriate OCR algorithm to be selected. In some cases, a character isolation or "segmentation" process may separate signal characters, for example, character-based OCR algorithms. In some cases, a normalization process may normalize the aspect ratio and/or scale of the image component.

Still referring to FIG. 1, in some embodiments, an OCR process will include an OCR algorithm. Exemplary OCR algorithms include matrix-matching process and/or feature extraction processes. Matrix matching may involve comparing an image to a stored glyph on a pixel-by-pixel basis. In some cases, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at the same scale as input glyph. Matrix matching may work best with typewritten text.

Still referring to FIG. 1, in some embodiments, an OCR process may include a feature extraction process. In some cases, feature extraction may decompose a glyph into features. Exemplary non-limiting features may include corners, edges, lines, closed loops, line direction, line intersections, and the like. In some cases, feature extraction may reduce dimensionality of representation and may make the recognition process computationally more efficient. In some cases, extracted features can be compared with an abstract vector-like representation of a character, which might reduce to one or more glyph prototypes. General techniques of feature detection in computer vision are applicable to this type of OCR. In some embodiments, machine-learning processes like nearest neighbor classifiers (e.g., k-nearest neighbors algorithm) can be used to compare image features with stored glyph features and choose a nearest match. OCR may employ any machine-learning process described in this disclosure, for example machine-learning processes described with reference to FIGS. 5-7. Exemplary non-limiting OCR software includes Cuneiform and Tesseract. Cuneiform is a multi-language, open-source optical character recognition system originally developed by Cognitive Technologies of Moscow, Russia. Tesseract is free OCR software originally developed by Hewlett-Packard of Palo Alto, California, United States.

Still referring to FIG. 1, in some cases, OCR may employ a two-pass approach to character recognition. The second pass may include adaptive recognition and use letter shapes recognized with high confidence on a first pass to recognize better remaining letters on the second pass. In some cases, two-pass approach may be advantageous for unusual fonts or low-quality image components where visual verbal content may be distorted. Another exemplary OCR software tool include OCRopus. OCRopus development is led by German Research Centre for Artificial Intelligence in Kaiserslautern, Germany. In some cases, OCR software may employ neural networks, for example and without limitation, neural networks as discussed below in this disclosure.

Still referring to FIG. 1, in some cases, OCR may include post-processing. For example, OCR accuracy can be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make use of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

With continued reference to FIG. 1, as previously discussed, measuring one or more subsystems 108*a-n* includes producing plurality of attribute data 112. Plurality of attribute data 112 may include one or more measurements of plurality of subsystems 108. In one or more embodiments, measurements may include qualitative or quantitative values related to one or more subsystems 108*a-n*. For instance, in one or more embodiments, a measurement may include numerical values from, for example, user records, financial records, human resource records, user profiles, sales records, revenue history, current revenue, manufacturing data, clientele records, user notes, and the like. In one or more embodiments, and without limitation, measurement may include, for example, a numerical value, a range of numerical values, a ratio of one or more elements or parameters of a subsystem to one or more other elements or attributes of the subsystem. For instance, and without limitation, a ratio may include a ratio between a first attribute and a second attribute of a first subsystem. For example, and without limitation, a ratio may include a rate of productivity, which may include an output per a duration of time. For example, and without limitation, a ratio may include an output of a particular product by a user per every hour. In another example, and without limitation, a ratio may include a total amount of time spent on a particular process. For example, and without limitation, a ratio may include an amount of time taken by a user to complete a specific task. In another example, and without limitation, a ratio may include a total duration of time spent by an individual on a particular task over the duration of the employment of the individual with a particular entity. In another example, and without limitation, measurement of one or more subsystems may include gains minus losses of user, such as of an entity. For instance, and without limitation, measurement may include overall revenue, profits, funding, clientele count, and the like, of a user, such as an entity or individual. In one or more embodiments, each measurement of plurality of attribute data 112 may be assigned a score. In other embodiments, measurements may be categorized and then assigned a score (e.g., an average score).

With continued reference to FIG. 1, score of each measurement may be determined using a scoring machine-learning model. For instance, and without limitation scoring machine-learning model may be used to rank one or more measurements of the plurality of attribute data. In one or more embodiments, and without limitation, each measurement may be assigned a score relative to a scale. Scoring machine-learning model may be trained by scoring training data that correlates a plurality of measurement inputs to a plurality of assigned score outputs. As defined in this disclosure, a "score" or "assigned score" is a measure or level of a scoring system that may be used to rank an optimization of a measurement based on a bound parameter. In one or more embodiments, score may include a numerical value to represent current optimization of a measurement. In one or more embodiments, measurement may be scored based on desirability or usefulness. For instance, and without limitation, a user having an attribute of high productivity then a score of the measurement related to such an attribute may be scored as a desirable or useful quality, and may, for example, be considered an optimal measurement. Bound parameter and/or parameters may be provided by the user, a third party, the government, an expert in the field, database, machine-learning process by analyzing past protocol parameters, and the like. In one or more embodiments, each of measurements of attribute data may be assigned a weight based on significance relative to a subgroup, such as a user record, cognitive identifier, performance and the like.

In one or more embodiments, scoring training data may be iteratively updated to update scoring machine-learning model 152. For instance, and without limitation, previous iterations of inputs and outputs of scoring machine-learning model may be used as updated scoring training data to update scoring machine-learning model. For example, and without limitation, a first training data set, from a database or user, may be used to train a first scoring machine-learning model; then a second training data set, from an updated database or previous inputs and outputs of first scoring machine-learning model may be used to train a second scoring machine-learning model and so on. Iteratively training scoring machine-learning model continuously updates scoring machine-learning model so that scoring machine-learning model may improve accuracy, reduce tolerances, and expand knowledge in the field.

Still referring to FIG. 1, in one or more embodiments, score may be determined by averaging weighted scores of individual measurements of a category, as described further in FIG. 5 below. For the purposes of this disclosure, "weights," as used herein, may be multipliers or other scalar numbers reflecting a relative importance of a particular attribute or value. A weight may include, but is not limited to, a numerical value corresponding to an importance of an element, such as an assigned score. In some embodiments, a weighted value may be referred to in terms of a whole number, such as 1, 100, and the like. As a non-limiting example, a weighted value of 0.2 may indicate that the weighted value makes up 20% of the total value. In some embodiments, a data query may be configured to filter out one or more "stop words" that may not convey meaning, such as "of," "a," "an," "the," or the like.

In some embodiments, and still referring to FIG. 1, apparatus 100 may use an objective function to categorize measurements and/or scores of a measurement. In one or more embodiments, a measurement may be categorized into a subgroup. An "objective function" as used in this disclosure is a process of minimizing or maximizing one or more values based on a set of constraints. Apparatus 100 may generate an objective function to optimize a comparison of attribute data to one or more bound parameters. For the purposes of this disclosure, a "bound parameter" is criteria used to define a type of attribute and/or measurement. In some embodiments, an objective function of apparatus 100 may include a criterion. A criterion may include any description of a desired value or range of values for one or more attributes of bound parameter. Desired value or range of values may include a maximal or minimal value, a range between maximal or minimal values, or an instruction to maximize or minimize bound parameter. As a non-limiting example, criterion may specify that a measurement should be categorized to a particular subgroup having data within a 4% difference of bound parameter. Criterion may cap a difference of measurement and bound parameter; for instance, specifying that measurement must not have a difference from bound parameter greater than a specified value. Criterion may specify one or more tolerances for differences in bound parameters. In other embodiments, criterion may specify one or more desired scores for measurement. In an embodiment, criterion may assign weights to different bound parameters or values associated with measurements. Weights may be multipliers or other scalar numbers reflecting a relative importance of a particular bound parameter or value. One or more weights may be expressions of value to a user of a particular outcome, value, or other facet of a categorization process. Value may be expressed, as a non-limiting example, in remunerative form, such as a data type, such as performance data, record data, and the like, or types of attributes, such as skills, education, temperament, deportment trait, personality, inventory records, financial records, human resource records, user profiles, sales rec, and the like. As a non-limiting example, minimization of differences of a measurement and one or more bound parameters may be multiplied by a first weight, while tolerance above a certain value may be multiplied by a second weight. Criteria may be combined in weighted or unweighted combinations into a function reflecting an overall outcome desired by a user; a function may be a transport function to be minimized and/or maximized. A function may be defined by reference to criteria constraints and/or weighted aggregation thereof as provided by apparatus 100; for instance, a bound parameter function combining criteria may seek to minimize or maximize a function of attribute or measurement classification.

Still referring to FIG. 1, apparatus 100 may use an objective function to compare measurements to bound parameter (e.g., threshold, such as lower or upper threshold). Generation of an objective function may include generation of a function to score and weight factors to achieve optimal and/or suboptimal measurements for each feasible pairing. In some embodiments, pairings may be scored in a matrix for optimization, where columns represent measurements and rows represent subgroups potentially paired therewith. Each cell of such a matrix may represent a score of a pairing of the corresponding measurement to the corresponding subgroup. In some embodiments, assigning a predicted process that optimizes the objective function includes performing a greedy algorithm process. A "greedy algorithm" is defined as an algorithm that selects locally optimal choices, which may or may not generate a globally optimal solution.

With continued reference to FIG. 1, optimizing an objective function may include minimizing a loss function, where a "loss function" is an expression an output of which an optimization algorithm minimizes to generate an optimal result. As a non-limiting example, apparatus 100 may assign variables relating to a set of parameters, which may correspond to score bound parameters as described above, calculate an output of mathematical expression using the variables, and select a pairing that produces an output having the lowest size, according to a given definition of "size," of the set of outputs representing each of plurality of measurement combinations; size may, for instance, included absolute value, numerical size, or the like. Selection of different loss functions may result in identification of different potential pairings as generating minimal outputs. Objectives represented in an objective function and/or loss function may include minimization of differences between measurements and bound parameters to identify optimal and suboptimal measurements.

Still referring to FIG. 1, in some embodiments, apparatus 100 may utilize subgroup classifier. Stage subgroup classifier may be trained with training data correlating measurements to subgroups. Training data may be received from user input, external computing devices, external databases, and/or previous iterations of processing. In some embodiments, subgroup classifier may input measurement (e.g., attribute data) and output a classification of measurement (e.g., attribute data) to one or more subgroups. Stage subgroup classifier may include any classifier and/or machine-learning model as used throughout this disclosure, such as the machine-learning model described in FIG. 2.

Still referring to FIG. 1, in some embodiments, apparatus 100 may categorize measurements to subgroup preemptively as a function of predicted bound parameters. Apparatus 100 may utilize a bound parameter machine-learning model. A bound parameter machine-learning model may be trained with training data correlating measurements to bound parameters. Training data may be received through user input, external computing devices, databases, and/or previous iterations of processing. A bound parameter machine-learning model may input measurement and output bound parameters. Apparatus 100 may use a bound parameter machine-learning model to predict subgroup. Any machine-learning model, classifier, and/or other algorithms may be trained on external computing devices and algorithm parameters and/or coefficients may be communicated to apparatus 100, without limitation. In some embodiments, apparatus 100 may train any machine-learning model, classifier, and/or other algorithms as described throughout this disclosure, without limitation.

With continued reference to FIG. 1, computing device and/or processor 104 may be configured to compare plurality of data 112 of one or more subsystems 108 to a continuum range 116. For example, and without limitation, each measurement of one or more subsystems may be compared to a continuum range 116. For the purposes of this disclosure, a "continuum range" is a standard or predetermined range of a subsystem. In one or more embodiments, continuum range 116 may include a set or predetermined range having a lower threshold and an upper threshold. A "lower threshold," for the purposes of this disclosure, is a minimum value of a continuum range. For instance, and without limitation, a lower threshold may include the minimum rate of productivity of a user. For example, and without limitation, a lower threshold may include a rate of productivity of 30%. An "upper threshold," for the purposes of this disclosure, is a maximum value of a continuum range. For instance, and without limitation, an upper threshold may include the maximum compensation of an individual of an entity. In another instance, and without limitation, upper threshold may include a maximum rate of productivity of a user. For example, and without limitation, an upper threshold for a rate of productivity may be 100%. In one or more embodiments, continuum range 116 may be determined by a user, a machine-learning model, a business standard, or the like. For instance, and without limitation, continuum range 116 may be input by a user, agent of an entity, official, or the like. For example, and without limitation, a continuum range 116 may be inputted into a prompt or questionnaire by an individual. In one or more embodiments, upper threshold and lower threshold may be identified using one or more threshold machine-learning models, such as an upper threshold machine-learning model and a lower threshold machine-learning model. Threshold-machine learning model may be generated using threshold training data, where the inputs are correlated to the outputs. The threshold training data inputs may include threshold data inputs and outputs may include upper threshold or lower threshold. Threshold data may include information provided by third parties, a user, publications, government bodies, other entities, and the like. Threshold data may include research data related to industry standards. In one or more embodiments, upper and lower threshold With continued reference to FIG. 1, continuum range 116, upper threshold, and/or lower threshold may each be expressed as a numerical score or a linguistic value, as previously mentioned in this disclosure. For instance, and without limitation, continuum range 116 may be represented as a discrete or continuous numerical scale of 1-10, 1-100, 1-1000, and the like. In other embodiments, continuum range 116 may be represented as a linguistic scale of "Low", "Medium", "High", and the like. In one or more embodiments, each of upper and lower threshold may be represented by a numerical value within the numerical scale, such as and without limitation, a 2 of a 1-10 scale, a 43 of a 1-100 scale, an 899 of a 1-1000, and so on. For example, and without limitation, a scale may include a 1-10 scale, where score of 1 may represent a user who is unproductive or far from achieving the endpoint element, whereas a rating of 10 may represent a user who is highly productive or close to achieving the endpoint element. Examples of linguistic values may include, "Below Average Aptitude," "Average Aptitude," "Good Aptitude," "Excellent Aptitude," and the like. In some embodiments, a numerical score range may be represented by a linguistic value. As used in the current disclosure, a "numerical score range" is a range of scores that are associated with a linguistic value. For example, this may include a score of 0-2 representing "Below Average Aptitude" or a score of 8-10 representing "Excellent Aptitude." In an embodiment, a measurement may be displayed in a graphical or visual manner. For example, and without limitation, a measurement may be shown or represented as a line graph, bar graph, pie chart, scatter plot, histogram, box and whisker plot, heat map, network graph, and the like. In one or more embodiments fuzzy set comparison 600 may be used to determine linguistic variables and corresponding value, as described further in FIG. 6.

With continued reference to FIG. 1, in one or more embodiments, upper threshold may include a numerical value or range of values within the scale representing an ideal or optimal measurement of the subsystem. Processor 108 may adjust the numerical score range of aptitude standard according to a desired level of an optimal measurement. Similarly, lower threshold may include a numerical value or range of values within the scale representing an undesirable or suboptimal measurement of the subsystem. Alternatively, processor may adjust the numerical score range to indicate the impact one or more measurements may have on the optimization of subsystem. In some embodiments, a continuum range may be determined by comparing the desired level of measurements from the subsystem to previous iterations of the numerical score ranges. Previous iterations' numerical score ranges may be taken from subsystems that are similarly situated to the current subsystem by, for example, attribute data. In other embodiments, previous iterations of a continuum range may be received from, for example, a database. A continuum range may be generated using a range machine-learning model. As used in the current disclosure, a "range machine-learning model" is a machine-learning model that is configured to identify a numerical or linguistic score range of a continuum range. The range machine-learning model may be consistent with the machine-learning model described below in FIG. 2.

Still referring to FIG. 1, in one or more embodiments, comparison between each measurement to continuum range 116 may include an assigned score 120 (also referred to herein as a "score"). In a non-limiting embodiment, score 120 may determine a performance of a user according to a set standard for a subsystem. For example, and without limitation, score may determine if an individual is optimally performing in their current role with the entity. For the purposes of this disclosure, a "score" is a value representing a placement of plurality of data of a subsystem, or a measurement, relative to a continuum range.

With continued reference to FIG. 1, score 116 may include an optimal measurement 124 and a suboptimal measurement 128. For instance, and without limitation, score 120 may include a quantitative or qualitative value indicating that a measurement is "low-scoring" or "weak" according to the continuum range 116. For example, and without limitation, a measurement may include a suboptimal measurement, or is a "low-scoring" or a "weak" measurement, if a value of a measurement is the same as or close to lower threshold of continuum range 116. In another instance, and without limitation, a score may include an optimal measurement, or is a "high-scoring" or "strong" measurement, if a value of the measurement is the same as or close to upper threshold of continuum range 116. In one or more embodiments, comparison between each measurement to continuum range 116 may include continuous or discrete values. For instance, and without limitation, a comparison may include qualitative values along a continuous scale, such as a decimal point scale. In other instances, and without limitation, a comparison may include quantitative values along a discrete scale, such as a whole number or integer scale. In another instance, and without limitation, comparison may include qualitative values, such as "low," "medium," and "high." In another instance, and without limitation, comparison may include both qualitative and quantitative values, such as a decimal point value that may be assigned to a qualitative category. For example, and without limitation, values between 0 and 3.5 (out of a 0 to 10 continuum range with a lower threshold of 0) may be assigned to a "low category, where a "low" category is considered undesirable or has a negative value for an attribute of a user, a discussed in further detail below.

With continued reference to FIG. 1, computing device and/or processor 104 is configured to identify, using the comparison of each measurement to continuum range 116, optimal measurement 124 of plurality of attribute data 112 of plurality of subsystem 108. For the purposes of this disclosure, an "optimal measurement" is a measurement that has a desirable score. A desirable score may include a "high" score, as previously discussed in this disclosure. For instance, and without limitation, optimal measurement 124 may include a measurement with a desirable score may include a "high-scoring" measurement. In one or more embodiments, a high-scoring measurement means that the measurement falls within an acceptable and/or ideal range of the continuum range 116, as discussed above. In some non-limiting embodiments, optimal measurement 124 may include a desirable measurement related to an attribute of an individual. For example, and without limitation, optimal measurement 124 may define an attribute of an employee positively, such as productivity, communication skills, temperament, mindset, and the like. In other non-limiting embodiments, optimal measurement 124 may include a desirable measurement related to a parameter of a user, such as a parameter of an entity. For example, and without limitation, optimal measurement 124 may define a parameter of the entity positively, such as revenue, client count, production output, and the like. Optimal measurement 124 may be identified out of the plurality of measurements of plurality of subsystems. For instance, and without limitation, an optimal measurement may include a productivity rate of an individual, such as an employee of an entity, of 90%, where a high-scoring measurement includes a measurement having a value between 80% to 100%. Optimal measurement 124 may suggest that a user is achieving a goal or strong in a particular area of practice or subsystem.

With continued reference to FIG. 1 computing device and/or processor 104 is configured to identify, using the comparison of each measurement to continuum range 116, a suboptimal measurement 128 of the plurality of measurements. For the purposes of this disclosure, a "suboptimal measurement" is a measurement that has an undesirable score. An undesirable score may include a "low" score, as previously discussed in this disclosure. For instance, and without limitation, suboptimal measurement 128 may include a measurement with an undesirable score may include a "low-scoring" measurement. In one or more embodiments, a low-scoring measurement means that the measurement falls within an unacceptable and/or non-ideal range of the continuum range 116, as discussed above. Thus, suboptimal measurement 128 may include a measurement that does not fall within an optimal or "high-scoring" range of the continuum range 116. In some non-limiting embodiments, suboptimal measurement 128 may include an undesirable measurement related to an attribute of an individual. For example, and without limitation, a suboptimal measurement 128 may define an attribute of an employee negatively, such as productivity, communication skills, temperament, mindset, and the like. In other non-limiting embodiments, suboptimal measurement 128 may include an undesirable measurement related to a parameter of a user, such as a parameter of an entity. For example, and without limitation, suboptimal measurement 128 may define a parameter of the entity negatively, such as revenue, client count, production output, and the like. A suboptimal measurement may be identified out of the plurality of measurements of plurality of subsystems. For instance, and without limitation, suboptimal measurement 128 may include a productivity rate of an individual, such as an employee of an entity, of 20%, where a low-scoring measurement includes a measurement having a value between 0% to 79%. Suboptimal measurement 128 may suggest that a user is not achieving a goal or is weak in a particular area of practice or subsystem.

With continued reference to FIG. 1, computing device and/or processor 104 may be configured to generate, for optimal measurement 124, a positive feedback function 132. For the purposes of this disclosure, a "positive feedback function" is an algorithm used to alter an optimal measurement. For instance, and without limitation, positive feedback function may be used to change one or more parameters of one or more subsystems to positively alter optimal measurement. More specifically, generating positive feedback function 132 may include identifying, using an optimal machine-learning model 136, a first set of parameter changes 140 to a subsystem corresponding to optimal measurement 124, where the set of parameter moves optimal measurement 124 further up continuum range 116. For example, and without limitation, a first set of parameter changes 140 may move optimal parameter toward a "positive" end of continuum range 116. For the purposes of this disclosure, a "parameter changes" may include instructions or alterations in one or more attributes or parameters of a subsystem to change a value of a measurement. For example, and without limitation, first set of parameter changes for optimal measurement may include instructions to changes in attributes or parameters of a first subsystem to move optimal measurement 124 within the continuum range 116. For example, and without limitation, first set of parameter changes to optimal measurement may include instructions to modify actions of a user, such as increasing productivity, increasing compensation, decreasing stress, and the like, or of an entity, such as, increasing profits, increasing production, increasing advertisement, decreasing waste, and the like.

With continued reference to FIG. 1, processor 104 may be configured to generate positive feedback function 132 using optimal-machine learning model 132. For example, and without limitation, processor 104 may be configured to identify first set of parameter changes 140 to a subsystem of the one or more subsystems using optimal machine-learning model 144. In various embodiments, optimal machine-learning model 136 may generate output, such as positive feedback function 132, as a function of input, such as attribute data 112 and/or optimal measurement 124. As used in the current disclosure, an "optimal machine-learning model" is a type of machine-learning model that is configured to generate one or more sets of parameter changes for an optimal measurement using a mathematical and/or algorithmic representation of a relationship between inputs and outputs. In some embodiments, optimal machine-learning model may include a classifier. Optimal machine-learning model may be consistent with machine-learning model described in this disclosure below in FIG. 2. Optimal machine-learning model may be generated using a training data set, such as optimal training data. A training data set may include training data inputs and corresponding training data outputs. In some embodiments, training data inputs may be received from a database, as discussed further below. Optimal machine-learning model may be trained using optimal training data. For the purposes of this disclosure, "optimal training data" is a plurality of data entries containing a plurality of inputs that are correlated to a plurality of outputs for training optimal machine-learning process 140. Training data inputs to optimal machine-learning model may include attributes of a user and/or measurements of a subsystem. For example, and without limitation, training data inputs may include, for example, training data attribute inputs and optimal measurement inputs, and training data outputs may include positive feedback outputs. As previously mentioned in this disclosure, updated training data may be used to train an updated optimal machine-learning model. For example, and without limitation, first training data may be used to generate a first optimal machine-learning model, second training data (e.g., updated training data that includes inputs and outputs of the first machine-learning model) may be used to generate a second optimal machine-learning model, and so on, so that optimal machine-learning model may be continuously and iteratively updated based on current previous inputs and outputs of optimal machine-learning model.

With continued reference to FIG. 1, training data may be received from a database, as previously mentioned in this disclosure. Any of the machine-learning models discussed in this disclosure may receive training data from a database. In an embodiment, any past or present versions of data (e.g., past or present inputs and correlated outputs of any of the machine-learning models, exemplary inputs and outputs, and the like) disclosed herein may be stored within database. Processor 104 may be communicatively connected with database. For example, in some cases, database may be local to processor 104. Alternatively or additionally, in some cases, database may be remote to processor 104 and communicative with processor 104 by way of one or more networks. Network may include, but not limited to, a cloud network, a mesh network, or the like. By way of example, a "cloud-based" system, as that term is used herein, can refer to a system which includes software and/or data which is stored, managed, and/or processed on a network of remote servers hosted in the "cloud," e.g., via the Internet, rather than on local severs or personal computers. A "mesh network" as used in this disclosure is a local network topology in which the infrastructure processor 104 connect directly, dynamically, and non-hierarchically to as many other computing devices as possible. A "network topology" as used in this disclosure is an arrangement of elements of a communication network. Database may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

With continued reference to FIG. 1, computing device and/or processor 104 may be configured to generate, for suboptimal measurement 128, a negative feedback function 144, where generating negative feedback function 144 further comprises identifying, using a suboptimal machine-learning model 148, a second set of parameter changes to a subsystem corresponding to suboptimal measurement 128, wherein the set of parameter changes move the suboptimal measurement further up the continuum (i.e. toward the positive end) using an error function. For example, and without limitation, processor 104 may be configured to generate negative feedback function 144 using suboptimal machine-learning model 148. For example, and without limitation, processor 104 may be configured to identify second set of parameter changes 152 to a subsystem of the one or more subsystems using suboptimal machine-learning model 148. In various embodiments, suboptimal machine-learning model 148 may generate output, such as negative feedback function 144, as a function of input, such as attribute data 112 and/or suboptimal measurement 128. For the purposes of this disclosure, a "negative feedback function" is an algorithm used to alter a suboptimal measurement. For instance, and without limitation, negative feedback function 144 may be used to change one or more parameters of one or more subsystems to positively alter suboptimal measurement. More specifically, generating negative feedback function 144 may include identifying, using a suboptimal machine-learning model 148, a second set of parameter changes 152 to a subsystem corresponding to suboptimal measurement 128, where the second set of parameter changes moves suboptimal measurement 128 further up continuum range 116. For example, and without limitation, second set of parameters changes 152 may move suboptimal parameter toward a "positive" end of continuum range 116. For example, and without limitation, second set of parameter changes 152 for suboptimal measurement may include instructions to changes in attributes or parameters of a first subsystem to move suboptimal measurement 128 within the continuum range 116. For example, and without limitation, second set of parameter changes 152 to suboptimal measurement 128 may include instructions to modify actions of a user, such as increasing productivity, increasing compensation, decreasing stress, and the like, or of an entity, such as, increasing profits, increasing production, increasing advertisement, decreasing waste, and the like. Machine learning algorithms may include unsupervised machine learning algorithms such as clustering models, k-means clustering, hierarchical clustering, anomaly detection, local outlier factor, neural networks, and the like. Machine-learning may include supervised machine learning algorithms using institutional training data. Machine-learning algorithm may train one or more neural networks such as convolutional and/or deep learning networks and are discussed more herein with reference to FIG. 2.

Still referring to FIG. 1, the processor may be configured to generate a machine-learning model, such as confidence machine-learning model 132, using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A)P(A)\div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Processor 104 may then calculate a likelihood table by calculating probabilities of different data entries and classification labels. processor 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

Still referring to FIG. 1, processor 104 may be configured to generate a machine-learning model, such as optimal machine-learning model 136 or suboptimal machine-learning model 148, using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute/as derived using a Pythagorean norm $l=\sqrt{\sum_{i=0}^{n} a_i^2}$, where $a_i$ is attribute number experience of the vector. Scaling and/or normalization may function to make vector comparison independent of absolute quantities of attributes, while preserving any dependency on the similarity of attributes; this may, for instance, be advantageous where cases represented in training data are represented by different quantities of samples, which may result in proportionally equivalent vectors with divergent values.

Still referring to FIG. 1, computing device and/or processor 104 configured to configure the at least one remote device 168 using positive feedback function 132 and/or negative feedback function 144. In one or more embodiments, one or more subsystems 108*a*-*n* may include corresponding one or more remote devices, such as remote device 168, as previously mentioned in this disclosure. In other embodiments, remote device 168 may include a device outside of subsystems 108*a*-*n*. In one or more embodiments, remote device 168 may be configured using positive feedback function 132 and/or negative feedback function 144 to optimize one or more of subsystems 108*a*-*n*. For instance, and without limitation, one or more processes of subsystems 108 and/or remote device 168 may be modified to implement feedback functions 132 and 144. The implementation of feedback functions may further optimize subsystems 108 and/or remote device 168 as a result. In one or more embodiments, processor 104 and/or remote device 168 may be configured to display any information, such as optimal measurement 124, suboptimal measurement 128, continuum range 116, first set of parameter changes 140, second set of parameters changes 152, any training data of any machine-learning models described in this disclosure, positive function feedback 132, negative function feedback 144, and the like, using a display component, such as display 164. For instance, and without limitation, information shown on display 164 may be presented in a data structure. As used in the current disclosure, a "display" is a device that is used to show content visually and audibly. Display 164 may include a user interface. A "user interface," as used in this disclosure, is a means by which a user and a computer system interact. User interface may include a graphical user interface (GUI), command line interface (CLI), menu-driven user interface, touch user interface, voice user interface (VUI), form-based user interface, any combination thereof, and the like. A user interface may include a smartphone, smart tablet, desktop, or laptop operated by the user. In an embodiment, the user interface may include a graphical user interface. A "graphical user interface (GUI)," as used herein, is a graphical form of user interface that allows users to interact with electronic devices. In some embodiments, GUI may include icons, menus, other visual indicators, or representations (graphics), audio indicators such as primary notation, and display information and related user controls. A menu may contain a list of choices and may allow users to select one from them. A menu bar may be displayed horizontally across the screen such as pulldown menu. When any option is clicked in this menu, then the pulldown menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run programs etc. because clicking on them yields instant access. Information contained in user interface may be directly influenced using graphical control elements such as widgets. A "widget," as used herein, is a user control element that allows a user to control and change the appearance of elements in the user interface. In this context a widget may refer to a generic GUI element such as a check box, button, or scroll bar to an instance of that element, or to a customized collection of such elements used for a specific function or application (such as a dialog box for users to customize their computer screen appearances). User interface controls may include software components that a user interacts with through direct manipulation to read or edit information displayed through user interface. Widgets may be used to display lists of related items, navigate the system using links, tabs, and manipulate data using check boxes, radio boxes, and the like.

With continued reference to FIG. 1, display 164 may include a virtual reality (VR) device. For the purposes of this disclosure, "virtual reality device" is an artificial computer-generated environment that simulates a three-dimensional space or world, which can be experienced by a user as if the user were actually there. The virtual reality device may be implemented in any suitable display 164 disclosed in the entirety of this disclosure. As a non-limiting example, the display 164 may include a virtual reality in a headset of a wearable device. The virtual reality device may alternatively or additionally be implemented using a display, which may display any data disclosed herein in the entirety of this disclosure including a digital avatar, as described in further detail above. Persons skilled in the art, upon reviewing the entirety of this disclosure, will be aware of various optical projection and/or display technologies that may be incorporated in virtual reality device consistently with this disclosure.

With continued reference to FIG. 1, a display 164 may include an augmented reality (AR) device. An "augmented reality device," as used in this disclosure, is a device that permits a user to view a typical field of vision of the user and superimposes virtual images on the field of vision. The augmented reality device may be implemented in any suitable display 164 disclosed in the entirety of this disclosure. As a non-limiting example, the display 164 may include an augmented reality in a mobile phone of a personal device. As another non-limiting example, the display 164 may include an augmented reality in a smart watch of the personal device. The augmented reality device may alternatively or additionally be implemented using a display, which may display any data disclosed herein in the entirety of this disclosure including a digital avatar, as described in further detail above. Persons skilled in the art, upon reviewing the entirety of this disclosure, will be aware of various optical projection and/or display technologies that may be incorporated in augmented reality device consistently with this disclosure.

Figure 2:
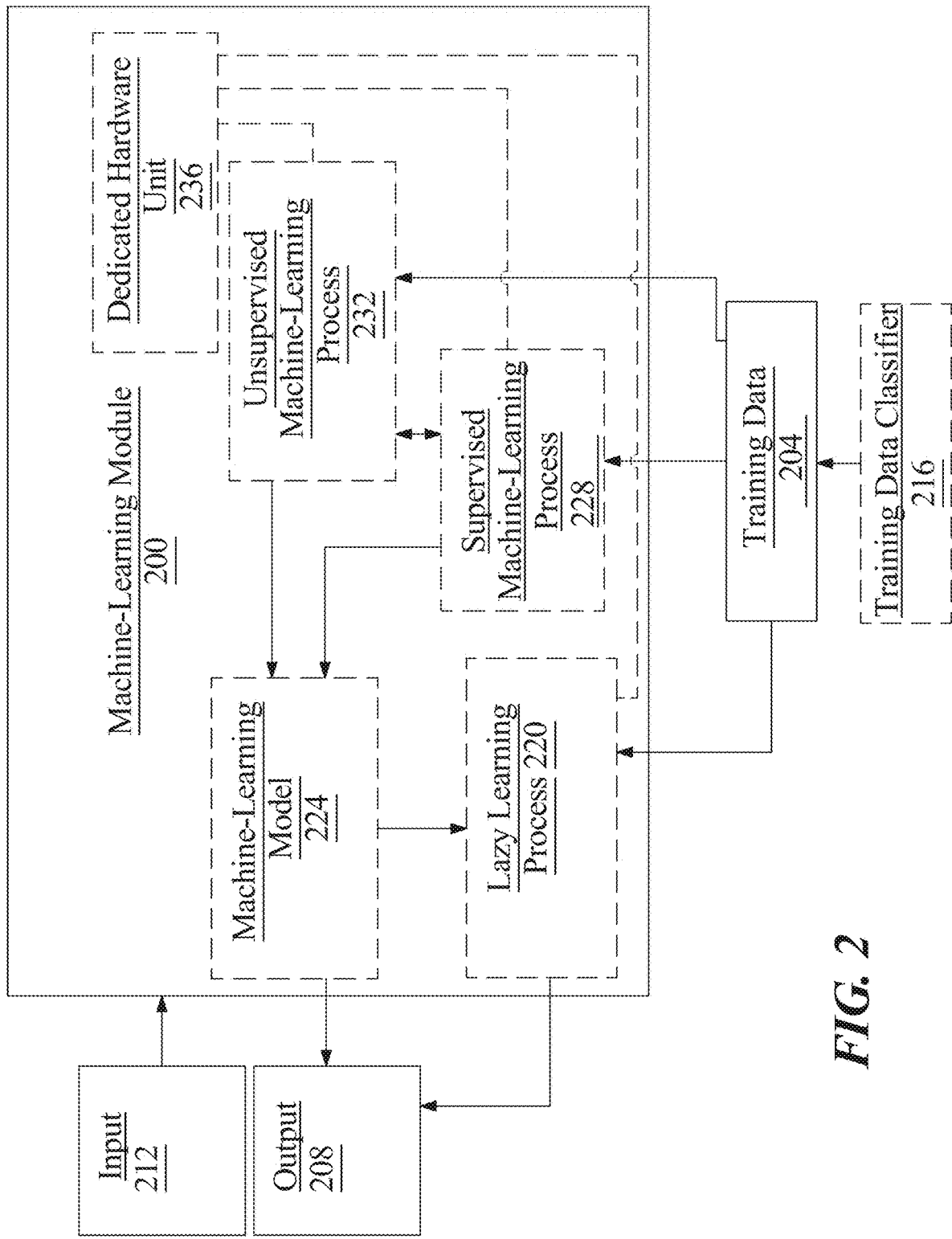
FIG. 2 is a block diagram of an exemplary machine-learning process.

Referring now to FIG. 2, an exemplary embodiment of a machine-learning module 200 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 204 to generate an algorithm instantiated in hardware or software logic, data structures, and/or functions that will be performed by a computing device/module to produce outputs 208 given data provided as inputs 212; this is in contrast to a non-machine learning software program where the commands to be executed are determined in advance by a user and written in a programming language.

Still referring to FIG. 2, "training data," as used herein, is data containing correlations that a machine-learning process may use to model relationships between two or more categories of data elements. For instance, and without limitation, training data 204 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input data as described in this disclosure to any output data as described in this disclosure. As a non-limiting illustrative example, in regard to scoring machine-learning model, scoring machine-learning model may be trained by scoring training data that correlates a plurality of measurement inputs to a plurality of assigned score outputs, as described above in FIG. 1. As another non-limiting illustrative example, bound parameter machine-learning model may input measurement and output bound parameters, as described above in FIG. 1. Bound parameter machine-learning model may be trained with training data correlating measurements to bound parameters. As another non-limiting illustrative example, range machine-learning model may include past ranges or predetermined range inputs correlated with continuum range outputs. As another non-limiting illustrative example, optimal machine-learning model may be generated using training data such as training data attribute inputs and optimal measurement inputs, and training data outputs may include positive feedback outputs, as previously discussed in FIG. 1.

Further referring to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 200 may generate a classifier using a classification algorithm, defined as a processes whereby a computing device and/or any module and/or component operating thereon derives a classifier from training data 204. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 216 may classify elements of training data to one or more sub-categories. As a non-limiting illustrative example, in regard to scoring machine-learning model, plurality of measurement inputs may be categorized into subcategories, such as measurement type, and plurality of assigned score outputs may be assigned to sub-categories such as ranking (e.g., low-scoring, medium-scoring, high-scoring, and so on), as described above in FIG. 1. As another non-limiting illustrative example, bound parameter machine-learning model may include a sub-category for inputs, such as measurement type, and a sub-category for outputs, such as desirability (e.g., low, medium, high), as described above in FIG. 1.

With further reference to FIG. 2, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Still referring to FIG. 2, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value.

As a non-limiting example, and with further reference to FIG. 2, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 2, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units In some embodiments, and with continued reference to FIG. 2, computing device, processor, and/or module may down-sample elements of a training example to a desired lower number of data elements. As a non-limiting example, a high pixel count image may have 256 pixels, however a desired number of pixels may be 128. Processor may downsample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Still referring to FIG. 2, machine-learning module 200 may be configured to perform a lazy-learning process 220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 2, machine-learning processes as described in this disclosure may be used to generate machine-learning models 224. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include inputs, such as the previously described inputs (e.g., optimal measurement inputs), and outputs, such as the previously described outputs (e.g., positive feedback outputs). A scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

With further reference to FIG. 2, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 2, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 232 may not require a response variable; unsupervised processes 232 may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods.

Machine-learning algorithms may include neural net algorithms, including convolutional neural net processes.

Still referring to FIG. 2, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 2, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 2, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 2, one or more processes or algorithms described above may be performed by at least a dedicated hardware unit 236. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 236 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 236 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 236 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 3:
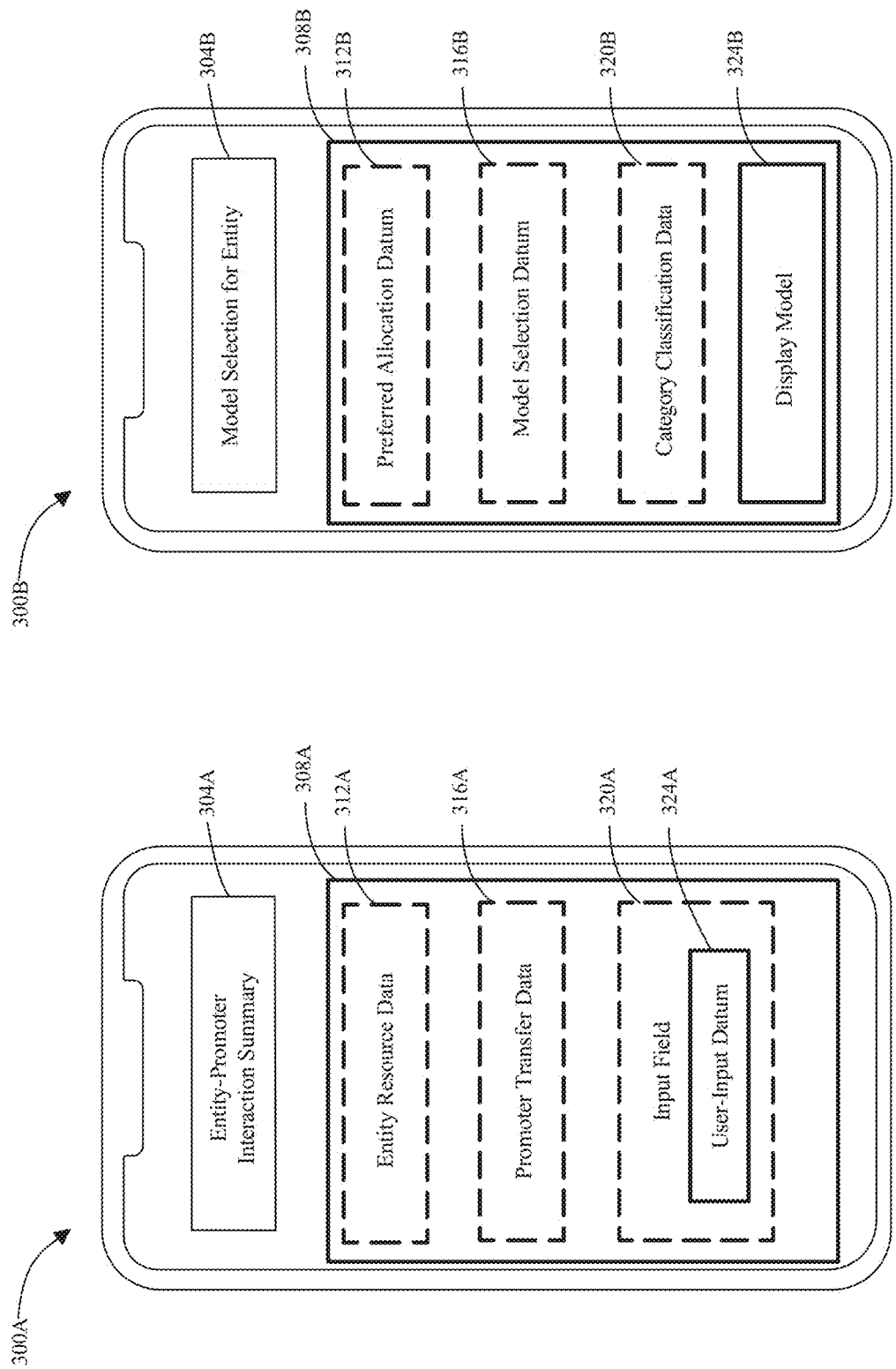
FIGS. 3A-B are exemplary embodiments of a user input field.

Referring now to FIGS. 3A and 3B, exemplary embodiments of a user input field as configured to be displayed by a GUI of a display device, such as display 164 of remote device 168, based on an interface data structure are illustrated. As defined earlier, a "data structure" or "interface data structure" refers to, for example, a data organization format used to digitally request a data result or action on the data (e.g., stored in a database). In one or more embodiments, each output screen 200A and 200B may be an example of an output screen configured to be displayed by display device 164 of FIG. 1 by the described interface data structure. That is, the described interface data structure may configure display device 168 of FIG. 1 to display any one or more of output screens 300A-300B as described in the present disclosure. Accordingly, output screen 300A may include multiple forms of indicia.

In one or more embodiments, output screen 300A and output screen 300B may be examples of user input fields and/or GUIs as displayed by remote device 168, which may be a "smart" phone, such as an iPhone, or other electronic peripheral or interactive cell phone, tablet, etc. Output screen 300A may be a screen initially displayed to a user (e.g., a human or a human representing or acting on behalf of a business or some other entity, and have user engagement area 308A including identification field 304A, entity resource data field 312A, second transfer field 316A, user-input field 320A, which may include one or more instances of user-input datum 324A describing data for selecting a preferred attribute of any one or more repayment behaviors associated with one or more instances of attribute data.

In addition, in one or more embodiments, user-input datum 324A may be reflective of and/or provide a basis for user attributes. Persons skilled in the art, upon reviewing the entirety of this disclosure, will be aware of various ways in which fewer or additional interactive user input fields may be displayed by user engagement area 308A. Identification field 304A may identify described processes performed by processor 104 of computing device by displaying identifying indicia, such as "Entity-Promoter Interactions Summary" to permit, for example, a human to interact with GUI and input information relating to a field of choice (e.g., business operations), through (for example) interactivity provided by identification field 304A.

Such information can include data describing activities performed by an individual or entity (e.g., attribute data, such as performance data, cognitive identifiers, and the like) and/or relating to the entity achieving a defined goal as described in FIG. 1. In some instances, a user, such as a person, may select from one or more options (not shown in FIG. 3A) relating to prompts provided by identification field 304A to input such information relating to specific details of, for example, the business or personal information. In addition, in some embodiments, any of the described fields may include interactive features, such as prompts, permitting for a human to select additional textual and/or other digital media options further identifying or clarifying the nature of the business relating to the respective specifics of that field. For example, entity resource data field 312A may display assessments of corresponding instruction sets regarding relevance and potential for positive impact on the business and may thereby also provide interactive features permitting the human to input additional data or information relating to expectations of positive of negative assessments for a given instruction set. Such additional human-input data may be computationally evaluated by described machine-learning processes executed by machine-learning module 120 and thereby correspondingly appear in the described progression sequence.

Like output screen 300A, output screen 300B may be an example of a screen subsequently shown to a user as described earlier based on human-provided input to any one or more of the displayed fields. For instance, and without limitation, output screen 300A may show optimization model, first set of parameters, second set of parameters, and the like. In some embodiments, output screen 300B may display "Model Selection for Entity" in identification field 304B as indicating completion of intake of human-provided input and that described machine-learning processes have completed described classifying processes to output projector inferencing data display area 308B to the user. For example, in one or more embodiments, projector inferencing data display area 308B may also include multiple human-interactive fields, including preferred allocation datum field 312B, model selection datum field 316B, label classification data field 320B, and display model field 324B generated as described earlier.

Persons skilled in the art, upon reviewing the entirety of this disclosure, will be aware of various ways in which fewer or additional interactive human input fields may be displayed by output screen 300B. Each field within projector inferencing data display area 308B may display any combination of human interactive text and/or digital media, each field intending to provide specific data-driven feedback directed to optimizing ongoing business performance of the business. Various example types of specifics (e.g., "assign a particular employee to one or more particular tasks based on parameters of the task") are shown in projector inferencing data display area 308B, but persons skilled in the art will be aware of other example types of feedback, each of which being generated as suitable for a given business by processor 104. In addition, in one or more embodiments, any one or more fields of projector inferencing data display area 308B may be human-interactive, such as by posing a for the human to provide feedback in the form of input such that described machine-learning processes performed by machine-learning module may intake refined input data and correspondingly process related data and provide an updated projector inferencing data display area 308B. In some embodiments, such processes may be performed iteratively, thereby allowing for ongoing refinement, redirection, and optimization of projector inferencing data display area 208B to better meet the needs of the client or user.

Figure 4:
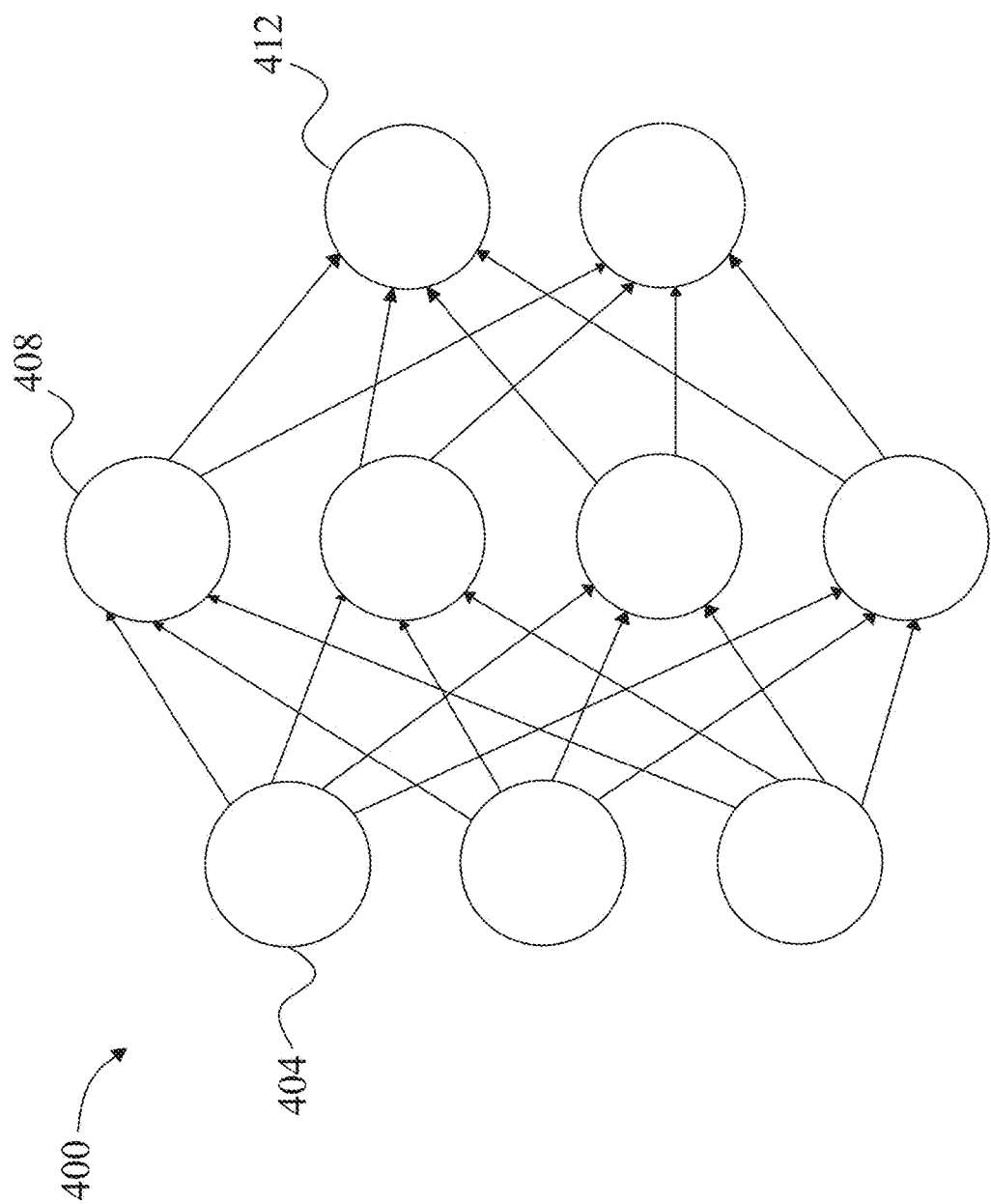
FIG. 4 is a diagram of an exemplary embodiment of a neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
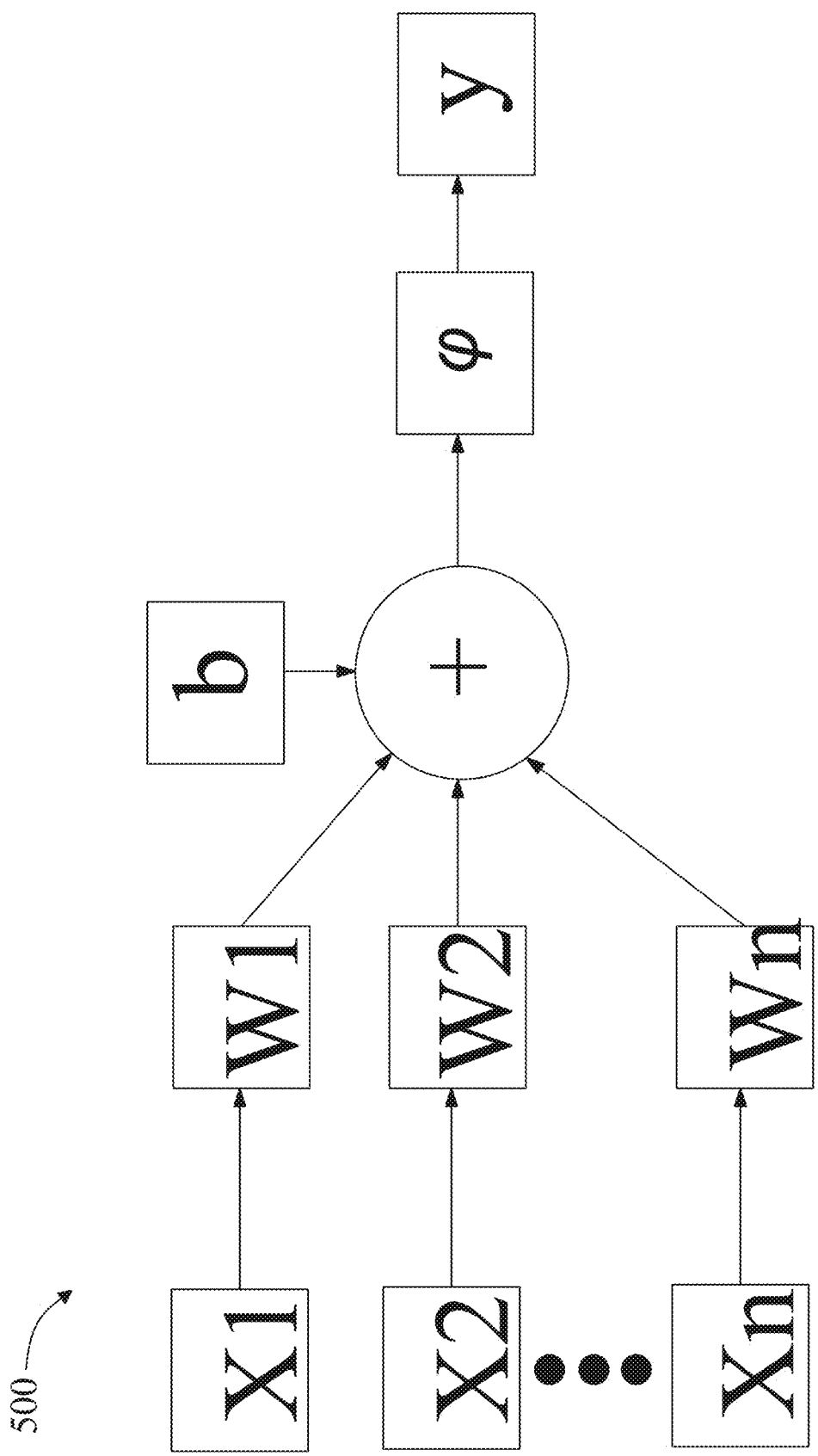
FIG. 5 is a diagram of an exemplary embodiment of a node of a neural network.

Referring now to FIG. 5, an exemplary embodiment of a node of a neural network is illustrated. A node may include, without limitation, a plurality of inputs x, that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function $\varphi$, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$, may be determined by training a neural network using training data, which may be performed using any suitable process as described above.

Figure 6:
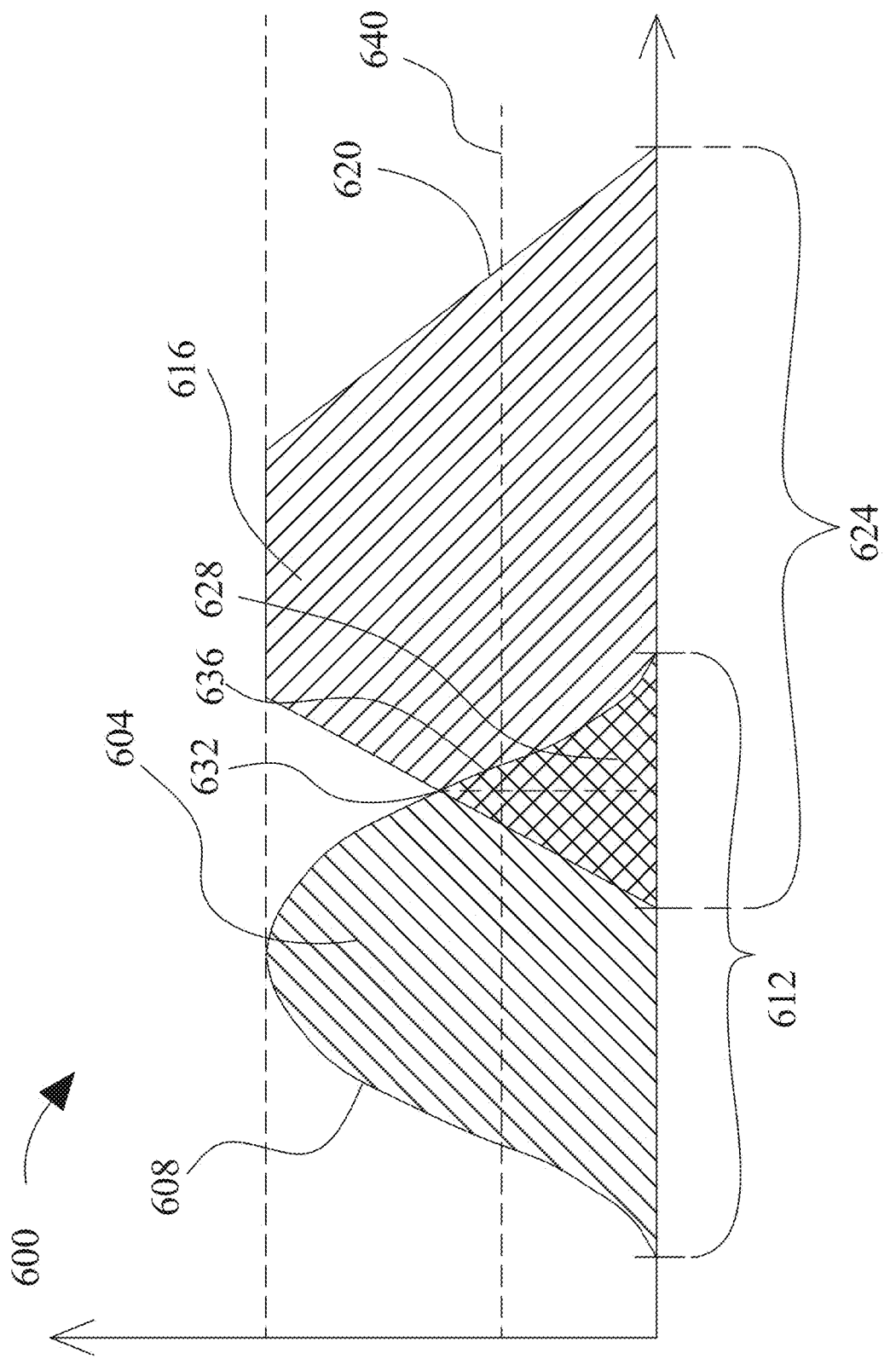
FIG. 6 an illustration of an exemplary embodiment of fuzzy set comparison.

Now referring to FIG. 6, an exemplary embodiment of fuzzy set comparison 600 is illustrated. In a non-limiting embodiment, the fuzzy set comparison. In a non-limiting embodiment, fuzzy set comparison 600 may be consistent with fuzzy set comparison in FIG. 1. In another non-limiting the fuzzy set comparison 600 may be consistent with the name/version matching as described herein. For example, and without limitation, the parameters, weights, and/or coefficients of the membership functions may be tuned using any machine-learning methods for the name/version matching as described herein. In another non-limiting embodiment, the fuzzy set may represent a plurality of biometric response data 120 and an example of a confidence factor 128 from FIG. 1.

Alternatively or additionally, and still referring to FIG. 6, fuzzy set comparison 600 may be generated as a function of determining data compatibility threshold. The compatibility threshold may be determined by a computing device. In some embodiments, a computing device may use a logic comparison program, such as, but not limited to, a fuzzy logic model to determine the compatibility threshold and/or version authenticator. Each such compatibility threshold may be represented as a value for a posting variable representing the compatibility threshold, or in other words a fuzzy set as described above that corresponds to a degree of compatibility and/or allowability as calculated using any statistical, machine-learning, or other method that may occur to a person skilled in the art upon reviewing the entirety of this disclosure. In some embodiments, determining the compatibility threshold and/or version authenticator may include using a linear regression model. A linear regression model may include a machine learning model. A linear regression model may map statistics such as, but not limited to, frequency of the same range of version numbers, and the like, to the compatibility threshold and/or version authenticator. In some embodiments, determining the compatibility threshold of any posting may include using a classification model. A classification model may be configured to input collected data and cluster data to a centroid based on, but not limited to, frequency of appearance of the range of versioning numbers, linguistic indicators of compatibility and/or allowability, and the like. Centroids may include scores assigned to them such that the compatibility threshold may each be assigned a score. In some embodiments, a classification model may include a K-means clustering model. In some embodiments, a classification model may include a particle swarm optimization model. In some embodiments, determining a compatibility threshold may include using a fuzzy inference engine. A fuzzy inference engine may be configured to map one or more compatibility threshold using fuzzy logic. In some embodiments, a plurality of computing devices may be arranged by a logic comparison program into compatibility arrangements. A "compatibility arrangement" as used in this disclosure is any grouping of objects and/or data based on skill level and/or output score. Membership function coefficients and/or constants as described above may be tuned according to classification and/or clustering algorithms. For instance, and without limitation, a clustering algorithm may determine a Gaussian or other distribution of questions about a centroid corresponding to a given compatibility threshold and/or version authenticator, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Still referring to FIG. 6, an evaluation factor may be represented as a function of the intersection two fuzzy sets as shown in FIG. 6, An inference engine may combine rules, such as any semantic versioning, semantic language, version ranges, and the like thereof. The degree to which a given input function membership matches a given rule may be determined by a triangular norm or "T-norm" of the rule or output function with the input function, such as min (a, b), product of a and b, drastic product of a and b, Hamacher product of a and b, or the like, satisfying the rules of commutativity (T(a, b)=T(b, a)), monotonicity: (T(a, b)≤T (c, d) if a≤c and b≤d), (associativity: T(a, T(b, c))=T(T(a, b), c)), and the requirement that the number 1 acts as an identity element. Combinations of rules ("and" or "or" combination of rule membership determinations) may be performed using any T-conorm, as represented by an inverted T symbol or "⊥," such as max(a, b), probabilistic sum of a and b (a+b−a*b), bounded sum, and/or drastic T-conorm; any T-conorm may be used that satisfies the properties of commutativity: ⊥(a, b)=⊥(b, a), monotonicity: ⊥(a, b)≤⊥(c, d) if a≤c and b≤d, associativity: ⊥(a, ⊥(b, c))=⊥(⊥(a, b), c), and identity element of 0. Alternatively or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively or additionally, output rules may be replaced with functions according to the Takagi-Sugeno-King (TSK) fuzzy model.

A first fuzzy set 604 may be represented, without limitation, according to a first membership function 608 representing a probability that an input falling on a first range of values 612 is a member of the first fuzzy set 604, where the first membership function 608 has values on a range of probabilities such as without limitation the interval [0,1], and an area beneath the first membership function 608 may represent a set of values within first fuzzy set 604. Although first range of values 612 is illustrated for clarity in this exemplary depiction as a range on a single number line or axis, first range of values 612 may be defined on two or more dimensions, representing, for instance, a Cartesian product between a plurality of ranges, curves, axes, spaces, dimensions, or the like. First membership function 608 may include any suitable function mapping first range 612 to a probability interval, including without limitation a triangular function defined by two linear elements such as line segments or planes that intersect at or below the top of the probability interval. As a non-limiting example, triangular membership function may be defined as:

$$(x, a, b, c) = \begin{cases} 0, \text{ for } x > c \text{ and } x < a \\ \frac{x-a}{b-a}, \text{ for } a \leq x < b \\ \frac{c-x}{c-b}, \text{ if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

First fuzzy set 604 may represent any value or combination of values as described above, including any a plurality of biometric response data 120 and an example of confidence factor 128. A second fuzzy set 616, which may represent any value which may be represented by first fuzzy set 604, may be defined by a second membership function 620 on a second range 624; second range 624 may be identical and/or overlap with first range 612 and/or may be combined with first range via Cartesian product or the like to generate a mapping permitting evaluation overlap of first fuzzy set 604 and second fuzzy set 616. Where first fuzzy set 604 and second fuzzy set 616 have a region 636 that overlaps, first membership function 608 and second membership function 620 may intersect at a point 632 representing a probability, as defined on probability interval, of a match between first fuzzy set 604 and second fuzzy set 616. Alternatively or additionally, a single value of first and/or second fuzzy set may be located at a locus 636 on first range 612 and/or second range 624, where a probability of membership may be taken by evaluation of first membership function 608 and/or second membership function 620 at that range point. A probability at 628 and/or 632 may be compared to a threshold 640 to determine whether a positive match is indicated. Threshold 640 may, in a non-limiting example, represent a degree of match between first fuzzy set 604 and second fuzzy set 616, and/or single values therein with each other or with either set, which is sufficient for purposes of the matching process; for instance, a confidence factor 128 may indicate a sufficient degree of overlap with fuzzy set representing a plurality of biometric response data 120 and an example of confidence factor 128 for combination to occur as described above. Each threshold may be established by one or more user inputs. Alternatively or additionally, each threshold may be tuned by a machine-learning and/or statistical process, for instance and without limitation as described in further detail below.

In an embodiment, a degree of match between fuzzy sets may be used to rank one resource against another. For instance, if both a plurality of biometric response data 120 and an example of a confidence factor 128 have fuzzy sets, a confidence factor 128 may be generated by having a degree of overlap exceeding a predictive threshold, processor 104 may further rank the two resources by ranking a resource having a higher degree of match more highly than a resource having a lower degree of match. Where multiple fuzzy matches are performed, degrees of match for each respective fuzzy set may be computed and aggregated through, for instance, addition, averaging, or the like, to determine an overall degree of match, which may be used to rank resources; selection between two or more matching resources may be performed by selection of a highest-ranking resource, and/or multiple notifications may be presented to a user in order of ranking.

Figure 7:
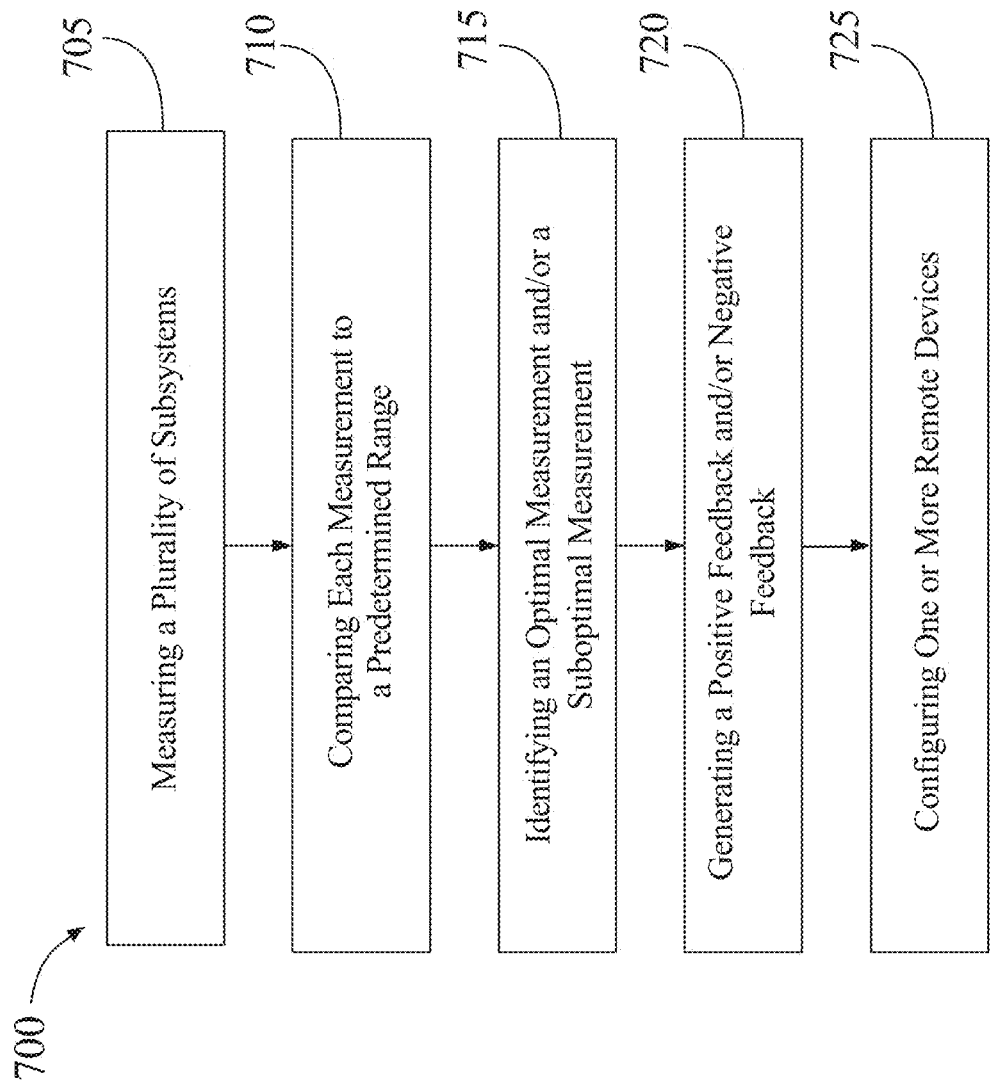
FIG. 7 is a flow diagram of an exemplary method for the generation and improvement of a confidence factor.

Referring now to FIG. 7, a flow diagram of an exemplary method 700 for identifying model optimization  is illustrated. At step 705, method 700 includes measuring, by computing device , plurality of subsystems **. In one or more embodiments, plurality of subsystems may include at least one remote device. In one or more embodiments, measuring produces a plurality of measurements. This may be implemented as described and with reference to FIGS. 1-6. In one or more embodiments, the subsystem of the plurality of subsystems comprises a plurality of data. This may be implemented as described and with reference to FIGS. 1-6. In one or more embodiments, subsystems include sets of activity, categories of actions, or the like that are performed by individuals, business entities, or any other collection of actions. This may be implemented as described and with reference to FIGS. 1-6.

Still referring to FIG. 7, at step 710, method 700 includes comparing, by computing device , each measurement of the plurality of measurements  to continuum range , where continuum range  includes lower threshold  and upper threshold . This may be implemented as described and with reference to FIGS. 1-6. The method of claim 1, wherein the continuum ranging comprises a lower threshold and an upper threshold. This may be implemented as described and with reference to FIGS. 1-6.

Still referring to FIG. 7, at step 715, method 700 includes identifying, by computing device **\*\*, optimal measurement \*\* of the plurality of measurements \*\* and suboptimal measurement \*\* of the plurality of measurements \*\* as a function of each of the comparisons. This may be implemented as described and with reference to FIGS. 1-6**.

Still referring to FIG. 7, at step 720, method 700 includes generating, by a computing device, a positive feedback function of the optimal measurement, wherein generating the positive feedback function further comprises identifying, using an optimal machine-learning model, a first set of parameter changes to a subsystem corresponding to the optimal measurement. This may be implemented as described and with reference to FIGS. 1-6. In one or more embodiments, the first set of parameter changes are configured to move the optimal measurement further up the continuum range and the second set of parameter changes are configured to move the suboptimal measurement further up the continuum range using an error function. This may be implemented as described and with reference to FIGS. 1-6.

Still referring to FIG. 7, at step 725, method 700 includes generating, by a computing device, a negative feedback function of the suboptimal measurement, wherein generating the negative feedback function comprises identifying, using a suboptimal machine-learning model, a second set of parameter changes to a subsystem corresponding to the suboptimal measurement. This may be implemented as described and with reference to FIGS. 1-6.

Still referring to FIG. 7, in one or more embodiments, generating positive feedback function includes generating positive feedback function using an optimal machine-learning model, where generating the positive feedback function includes obtaining optimal training data, wherein the optimal training data includes optimal measurement inputs and correlated positive feedback outputs, training optimal machine-learning model using the optimal training data, and generating positive feedback function as a function of optimal measurement. In one or more embodiments, generating negative feedback function includes generating negative feedback function using a suboptimal machine-learning model, wherein generating the negative feedback function includes obtaining suboptimal training data, wherein the suboptimal training data includes suboptimal measurement inputs and correlated negative feedback outputs, training suboptimal machine-learning model using the suboptimal training data, and generating negative feedback function as a function of suboptimal measurement. In one or more embodiments, updating the positive feedback function comprises generating an updated optimal machine-learning model, wherein generating the updated optimal machine-learning model includes obtaining updated optimal training data, wherein the updated optimal training data includes an input of suboptimal measurement, and an output of the negative feedback function generated by the suboptimal machine-learning model, training optimal machine-learning model using the updated optimal training data, and generating an updated positive feedback function as a function of an updated optimal measurement.

Still referring to FIG. 7, at step 730, method 700 includes configuring the at least one remote device using the positive feedback function and the negative feedback function. This may be implemented as described and with reference to FIGS. 1-6. In one or more embodiments, configuring the at least a remote device further includes configuring the at least a remote device to display the first set of parameter changes and the second set of parameter changes. In one or more embodiments, the method includes displaying a data structure related to the configuration.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
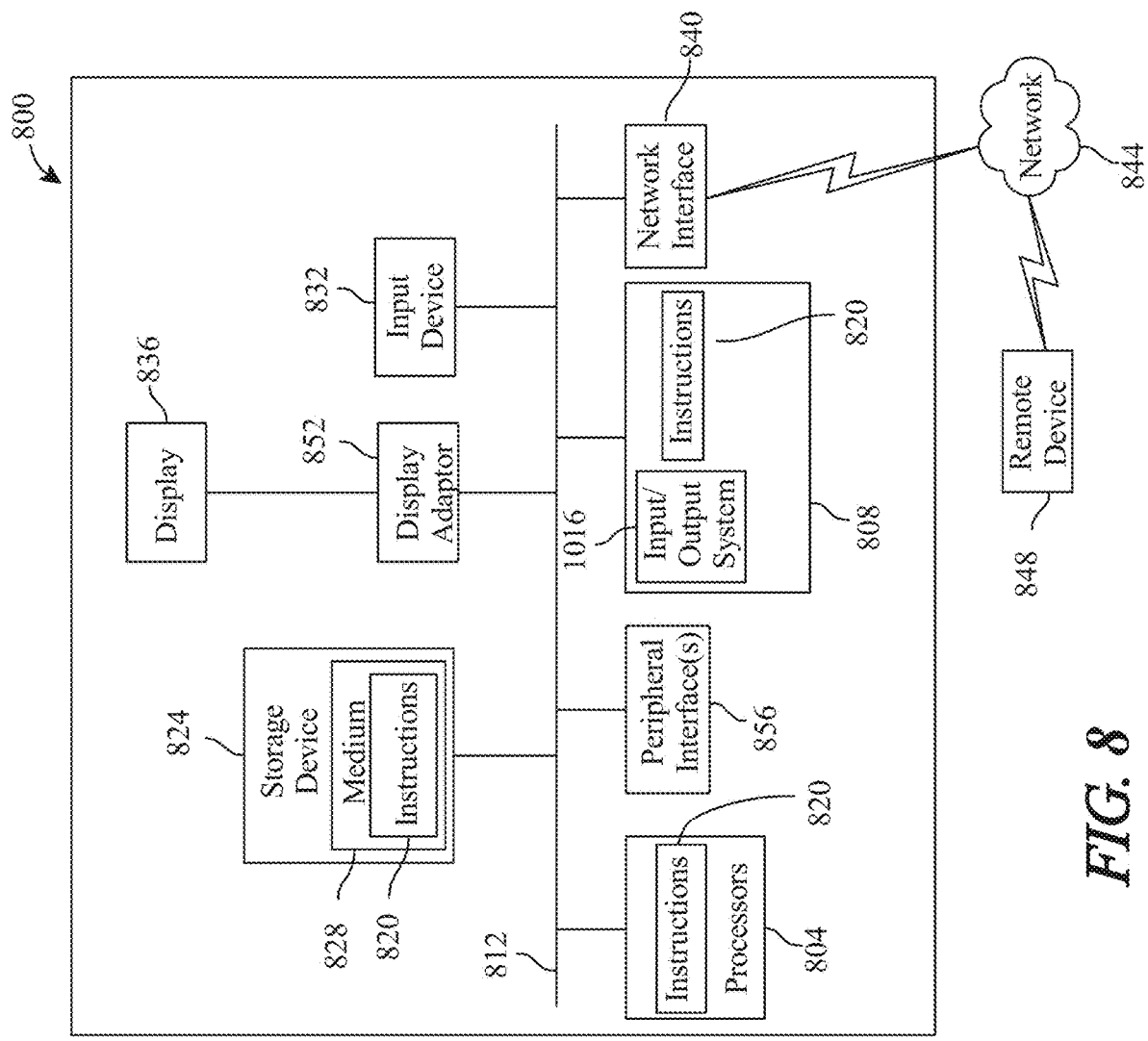
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. A method for identifying model optimization, the method comprising:
   measuring, by a computing device, a plurality of subsystems, wherein the plurality of subsystems includes at least one remote device, and wherein measuring the plurality of subsystems produces a plurality of measurements;
   comparing, by the computing device, each measurement of the plurality of measurements to a predetermined continuum range, wherein the predetermined continuum range comprises a lower threshold and an upper threshold;
   identifying, by the computing device, an optimal measurement of the plurality of measurements and a suboptimal measurement of the plurality of measurements as a function of each of the comparisons;
   generating, by the computing device, a positive feedback function of the optimal measurement, wherein generating the positive feedback function further comprises identifying, using an optimal machine-learning model, a first set of parameter changes to a subsystem corresponding to the optimal measurement, wherein the optimal machine-learning model is generated by updating a previous optimal machine learning model, wherein updating the previous optimal machine learning model comprises:
      receiving optimal training data, wherein the optimal training data comprises a plurality of data entries containing a plurality of optimal measurements as inputs correlated to a plurality of positive feedbacks as outputs;
      training the previous machine-learning model using the optimal training data;
      sanitizing the optimal training data using a dedicated hardware unit comprising circuitry configured to perform signal processing operations, wherein sanitizing the optimal training data comprises:
         determining by the dedicated hardware unit that a training data entry has a signal to noise ratio below a threshold value; and
         removing the training data entry from the optimal training data;
      retraining the previous machine-learning model using the sanitized training data; and
      generating the positive feedback function as a function of the optimal measurement using the retrained optimal machine-learning model;
   generating, by the computing device, a negative feedback function of the suboptimal measurement, wherein generating the negative feedback function comprises identifying, using a suboptimal machine-learning model, a second set of parameter changes to a subsystem corresponding to the suboptimal measurement; and
   configuring the at least one remote device using the positive feedback function and the negative feedback function.

2. The method of claim 1, wherein configuring the at least a remote device further comprises configuring the at least a remote device to display the first set of parameter changes and the second set of parameter changes.

3. The method of claim 1, wherein the subsystem of the plurality of subsystems comprises a plurality of data.

4. The method of claim 1, wherein the subsystems include sets of activity and categories of actions that are performed by individuals and business entities.

5. The method of claim 1, wherein the first set of parameter changes is configured to move the optimal measurement further up the predetermined continuum range.

6. The method of claim 1, wherein the second set of parameter changes is configured to move the suboptimal measurement further up the predetermined continuum range using an error function.

7. The method of claim 1, further comprising displaying a data structure related to the configuration.

8. An apparatus for model optimization, wherein the apparatus comprises:
   at least a processor; and
   a memory communicatively connected to the at least a processor, wherein the memory containing instructions configuring the at least a processor to:
      measure a plurality of subsystems, wherein the plurality of subsystems includes at least one remote device, and wherein measuring the plurality of subsystems produces a plurality of measurements;
      compare each measurement of the plurality of measurements to a predetermined continuum range, wherein the predetermined continuum range comprises a lower threshold and an upper threshold;
      identify an optimal measurement of the plurality of measurements and a suboptimal measurement of the plurality of measurements as a function of each of the comparisons;
      generate a positive feedback function of the optimal measurement, wherein generating the positive feedback function further comprises identifying, using an optimal machine-learning model, a first set of parameter changes to a subsystem corresponding to the optimal measurement, wherein the optimal machine-learning model is generated by updating a previous optimal machine learning model, wherein updating the previous optimal machine learning model comprises:
         receiving optimal training data, wherein the optimal training data comprises a plurality of data entries containing a plurality of optimal measurements as inputs correlated to a plurality of positive feedbacks as outputs;
         training the previous machine-learning model using the optimal training data;
         sanitizing the optimal training data using a dedicated hardware unit comprising circuitry configured to perform signal processing operations, wherein sanitizing the optimal training data comprises:
            determining by the dedicated hardware unit that a training data entry has a signal to noise ratio below a threshold value; and
            removing the training data entry from the optimal training data;

retraining the previous machine-learning model using the sanitized training data; and generating the positive feedback function as a function of the optimal measurement using the retrained optimal machine-learning model;

generate a negative feedback function of the suboptimal measurement, wherein generating the negative feedback function comprises identifying, using a suboptimal machine-learning model, a second set of parameter changes to a subsystem corresponding to the suboptimal measurement; and configure the at least one remote device using the positive feedback function and the negative feedback function.

9. The apparatus of claim 8, further comprising configuring a remote device configured to display the first set of parameter changes and the second set of parameter changes.

10. The apparatus of claim 8, wherein the subsystem of the plurality of subsystems comprises a plurality of data.

11. The apparatus of claim 8, wherein the subsystems include sets of activity and categories of actions that are performed by individuals and business entities.

12. The apparatus of claim 8, wherein the measurements comprise ratios of one parameter to another, including a rate of productivity measured in output per hour, a duration, including total time spent on a process, and total time that a person remains employed, and/or differences including gains minus losses.

13. The apparatus of claim 8, wherein the second set of parameter changes moves the suboptimal measurement further up the predetermined continuum range using an error function.

14. The apparatus of claim 8, wherein the first set of parameter changes and the second set of parameters comprise instructions to modify parameters of the subsystems.

* * * * *